United States Patent
Choi et al.

(10) Patent No.: US 8,244,844 B2
(45) Date of Patent: Aug. 14, 2012

(54) TOOL FOR DATA GENERATION FOR SIMPLE NETWORK MANAGEMENT PROTOCOL (SNMP)

(75) Inventors: Seung Pil Choi, Yongin-si (KR); Song Bong Gyu, Suwon-si (KR); BalaSubrahmanyam Gattu, Richardson, TX (US); Michael David Hall, Carrollton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1916 days.

(21) Appl. No.: 11/384,068

(22) Filed: Mar. 17, 2006

(65) Prior Publication Data
US 2007/0220159 A1    Sep. 20, 2007

(51) Int. Cl.
*G06F 15/173* (2006.01)
(52) U.S. Cl. ............ 709/223; 717/106
(58) Field of Classification Search .......... 709/223–225; 717/106
See application file for complete search history.

(56) References Cited

U.S. PATENT DOCUMENTS

| | | | | |
|---|---|---|---|---|
| 6,332,142 | B1* | 12/2001 | LeBlanc | 717/118 |
| 6,981,038 | B2* | 12/2005 | McKenzie et al. | 709/223 |
| 7,099,931 | B2* | 8/2006 | Da Palma et al. | 709/220 |
| 7,506,041 | B1* | 3/2009 | Shelton et al. | 709/223 |
| 2006/0106925 | A1* | 5/2006 | Song et al. | 709/223 |
| 2006/0142284 | A1* | 6/2006 | Tang | 514/235.5 |
| 2006/0242284 | A1* | 10/2006 | Savage | 709/223 |
| 2008/0040467 | A1* | 2/2008 | Mendiratta et al. | 709/223 |

OTHER PUBLICATIONS

Gattu, BalaSubrahmanyam, et al., "Simple Network Management Protocol (SNMP) Agent System and Method," Filing Date—Mar. 17, 2006, U.S. Appl. No. 11/378,023, Specification (35 pgs.) and Drawings (6 sheets).

* cited by examiner

*Primary Examiner* — Duyen Doan (57) ABSTRACT

A tool is provided for automated SNMP data generation. The tool includes a special header file operable to contain standard header file data and special comment data. The tool also includes an extractor, a MIB generator component, and an OIDInformation file. The extractor component is operable to convert the special header file into a managed object structure description file. The MIB generator component is operable to convert the managed object structure description file into a management information base file. The OIDInformation generator component is operable to convert the managed object structure description file into an OIDInformation file. The OIDInformation file is operable to retain and provide data related to a network resource.

20 Claims, 6 Drawing Sheets

FIG.7

TOOL FOR DATA GENERATION FOR SIMPLE NETWORK MANAGEMENT PROTOCOL (SNMP)

CROSS-REFERENCE TO RELATED APPLICATIONS

This application is related to co-pending U.S. patent application Ser. No. 11/378,023, entitled "Simple Network Management Protocol (SNMP) Agent System and Method", inventors Gattu et al., which is filed on even date herewith and is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to network management. More specifically, but not by way of limitation, a method and system are described that provide for a Simple Network Management Protocol agent that is independent of a Management Information Base and an application data structure. A method and system for automatically generating a data file usable by the Simple Network Management Protocol agent are also provided.

BACKGROUND OF THE INVENTION

The Simple Network Management Protocol (SNMP) is a set of standards for monitoring and controlling components in a network, such as a telecommunications network or a computer network. Components managed through SNMP might include computers, routers, bridges, hubs, switches, mobile switching centers, base stations, gateways, and other network elements well known to one of skill in the art. Software applications within such network elements might also be monitored and controlled. As used herein, the terms "network resource" and "resource" will refer to any such hardware component, software application, or other object managed through SNMP.

Through the use of SNMP, network resources can be configured, network performance parameters can be monitored, and faults in a network can be detected. Resource configuration deals with specifying the values of the attributes of a resource. Performance parameters that are monitored might include availability, response time, accuracy, throughput, and utilization. Fault monitoring deals with detecting and reporting undesirable conditions in a network or a network resource.

An SNMP agent typically collects performance data and other information from one or more network resources. One or more SNMP agents then provide this information to an SNMP manager. In some cases, the SNMP manager requests information from an SNMP agent and the agent retrieves the requested information from a network resource and returns the information to the SNMP manager. The SNMP manager typically uses a Get command or a similar command to retrieve information in this manner.

In other cases, the SNMP agent might send information to the SNMP manager without a request from the SNMP manager. Unsolicited information might be sent from an SNMP agent to the SNMP manager at periodic intervals or when significant events, such as failures, occur in a network resource. A Trap command or a similar command is typically used to send data from an SNMP agent to an SNMP manager in this manner.

Upon receiving data from an SNMP agent, the SNMP manager might perform a statistical analysis on the data and display the results of the analysis on a user interface. Alternatively, the SNMP agent might conduct the analysis and send the results to the SNMP manager for the SNMP manager to display.

The SNMP manager can also be used to configure network resources. That is, the SNMP manager can send a desired value for an attribute of a network resource to the SNMP agent associated with that network resource. The SNMP agent can then set the attribute to the specified value. A Set command or a similar command is typically used to specify an attribute value in this manner.

Network resources and attributes of network resources are identified under SNMP through a model known as the Structure of Management Information (SMI). SMI specifies a tree-like hierarchical structure using a series of digits and dots to give a unique identifier to each network element, application, and attribute. The unique identifier is known as an Object Identifier or OID. As an example, a particular network element might be given an OID of 1.2.3. Applications running on that network element might then have OIDs of 1.2.3.1, 1.2.3.2, 1.2.3.3, etc. Attributes of application 1.2.3.1, for example, might have OIDs of 1.2.3.1.1, 1.2.3.1.2, 1.2.3.1.3, etc. (One of skill in the art will recognize that these OIDs have been simplified for the sake of clarity. Actual OIDs might have different hierarchical structures and would typically be considerably longer than these examples.)

To transmit or communicate regarding attribute information within an SNMP-managed network, the OID associated with the attribute and the value of the attribute are transferred between an SNMP manager and an SNMP agent. For example, if an SNMP manager wished to retrieve the value of attribute 1.2.3.1.3, the SNMP manager might issue a Get command with an argument of 1.2.3.1.3 to the SNMP agent associated with network element 1.2.3. The SNMP agent would then retrieve the value associated with that OID and return the value to the SNMP manager.

A mapping of network resources and attributes to their associated OIDs is contained in a data store known as a Management Information Base (MIB). The MIB might also contain descriptions for tables, attributes, and notifications, and other application data structure information. The MIB might take the form of a table where each row corresponds to a particular network resource and each column corresponds to an attribute of a network resource. The SNMP manager and the SNMP agent both have access to the application data structure information in the MIB so that they can communicate with one another using the appropriate OIDs.

SUMMARY OF THE INVENTION

In one embodiment, a tool is provided for automated SNMP data generation. The tool includes a special header file operable to contain standard header file data and special comment data. The tool also includes an extractor, a MIB generator component, and an OIDInformation file. The extractor component is operable to convert the special header file into a managed object structure description file. The MIB generator component is operable to convert the managed object structure description file into a management information base file. The OIDInformation generator component is operable to convert the managed object structure description file into an OIDInformation file. The OIDInformation file is operable to retain and provide data related to a network resource.

In another embodiment, a computer readable medium is provided that contains software for automated network resource related data generation. The software includes an extractor component that is in communication with a special header file that contains at least some standard header file data and at least some special comment data. The extractor is operable to extract the standard header file data and the special comments data. The software includes MIB generator component that is in communication with the extractor component. The MIB generator component is operable to convert the extracted data into a management information base file. The software also includes an OIDInformation generator component in communication with the extractor component. The OIDInformation generator component is operable to convert the extracted data into an OIDInformation file that maintains data related to a network resource. The OIDInformation file is used by a generic SNMP agent on the network resource.

In another embodiment, a method is provided for automated network resource related data generation. The method includes adding a plurality of special comments to a standard header file. The method includes converting the special header file into a managed object file, and converting the managed object file into a management information base file. The method includes converting the managed object file into an OIDInformation file, the OIDInformation file maintaining data related to a network resource These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Previously communication between an SNMP manager and an SNMP agent occurs via a limited set of commands. In addition to the Get, Set, and Trap commands mentioned previously, only a few other commands, such as GetBulk and GetNext are available. On the other hand, communication between an SNMP agent and its associated resources occurs via a very large set of method calls. Typically, a different method is used for every attribute of every network resource.

When an SNMP agent receives a command from an SNMP manager, the SNMP agent uses information from the MIB to translate the command into the appropriate method. For example, if the SNMP manager wished to retrieve the current power level of a base station controller, and if the OID for the power level on that base station controller were 1.2.3.1.1, the SNMP manager would send a Get command with the argument 1.2.3.1.1 to the SNMP agent associated with that base station controller. The SNMP agent would then convert this information into a method, such as Get_Power_Level( ), and would send a call with this method to the base station controller to retrieve the requested information. For a Get command with a different argument, a different SNMP agent might generate a different method and send a method call to a different network resource. The method names are typically tied to the attribute names for each different network resource. Therefore, whenever an attribute name changes, the associated method name typically must be modified and the SNMP agent typically must be recompiled to make use of the new method name.

Previously, an SNMP agent would be compiled in conjunction with a MIB. That is, when an SNMP agent is created, the data in the MIB becomes an integral part, such as part of the executable instructions of the SNMP agent. The SNMP agent can then look internally, rather than to an external data store, for information on converting commands from an SNMP manager into appropriate methods and for other information needed for communication with its associated network resources and with the SNMP manager.

When a MIB is integrated with an SNMP agent in this manner, the SNMP agent can become quite large since the MIB can contain a great deal of data. Deployment and operation of a large SNMP agent can become difficult. Also, any change that occurs in the structure of a MIB requires recompiling the SNMP agent associated with that MIB. During the operation of a network, a new type of resource may be added to a network element. Such a change or any other change in the structure of a MIB would require that any SNMP agent compiled in conjunction with the MIB be recompiled so that the new MIB could be integrated with the SNMP agent. The SNMP agent would then have to be extensively retested to ensure that it functions properly. After successful testing, the SNMP agent would have to be redeployed into every network resource on which it would operate. Recompiling, retesting, and redeploying the SNMP agent can be cumbersome, time-consuming, and error prone.

In embodiments of the present disclosure, an SNMP agent is described that is independent of a MIB and any other application data structures. Information that was traditionally stored in the MIB is stored in a data store or file that can be referred to as the OIDInformation file. An SNMP agent can consult the OIDInformation file at run time to retrieve any information it needs to communicate with its network resources and with an SNMP manager.

The same source code can be used by multiple SNMP agents to retrieve data from their OIDInformation files regardless of the contents of the OIDInformation files. If a change occurs in the structure of the MIB on which an OIDInformation file was based, the corresponding changes can be made to the OIDInformation file and the modified OIDInformation file can replace the previous OIDInformation file. The SNMP agent can then communicate with the new OIDInformation file without the need for any changes to the SNMP agent source code or redeployment of the SNMP agent.

In this way, the need to recompile, retest, and redeploy the SNMP agent every time the MIB changes can be avoided. An updated OIDInformation file is simply sent to any SNMP agents that might be affected by the changes to the MIB. FTP or other data transmission protocols might be used to distribute the updated OIDInformation file. The SNMP agents do not need to be restarted when the new OIDInformation file arrives. Also, a generic SNMP agent can be deployed on disparate types of network resources, eliminating the need to build a custom SNMP agent for each type of network resource.

It should be appreciated that SNMP is a widely used messaging protocol for network devices, and that SNMP has significant limitations. Network device providers focus on enhancing device functionality and do not want to waste time developing a custom SNMP agent for every device. Therefore the network device manufacturers write code that plugs into generic off-the-shelf SNMP manager/agent systems. Unfortunately, the existing development process leads to the current problem where modification require retesting, compiling, redeploying the SNMP agent to each network device. Thus, neither the hardware manufactures nor the vendors of the SNMP manager/agents are focused on the problems associated with managing these network devices and the SNMP agents. The present system eliminates these limitations, including the need to retest, recompile, and redeploy the SNMP agent when making changes, for example, to attributes or other such modifications related to management of a network device.

Figure 1:
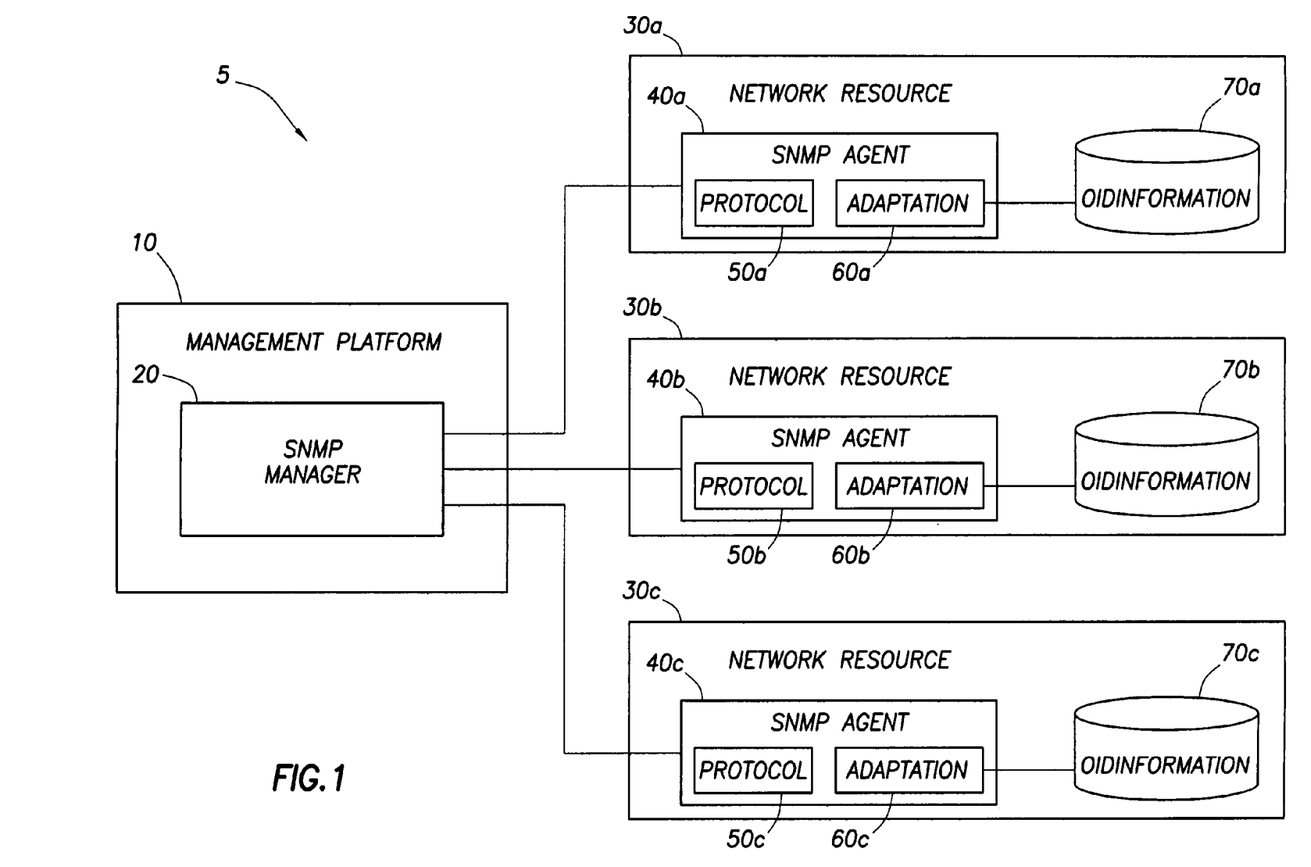
FIG. 1 illustrates a network according to an embodiment of the present disclosure.

FIG. 1 illustrates an embodiment of a network 5 in which a MIB-independent SNMP agent is used. An SNMP manager 20 residing on a management platform 10 can communicate with a plurality of network resources 30. Each network resource 30 contains or communicates with a MIB-independent SNMP agent 40. The SNMP agent 40 contains a protocol component 50 and an adaptation component 60.

The protocol component 50 is capable of receiving standard SNMP commands from the SNMP manager 20, such as the Get and Set commands described above. The protocol component 50 parses the SNMP commands to determine the type of command and the argument, or variable binding, the command contains. The protocol component 50 then sends the parsed information to the adaptation component 60. The adaptation component 60 refers to its associated OIDInformation file 70 to retrieve information that allows the SNMP agent 40 to issue method calls to an associated network resource 30. The SNMP agent 40 then issues the method call.

Each network resource 30 has an associated OIDInformation file 70 that contains data pertinent to that network resource 30 and to the SNMP agent 40 associated with that network resource 30. That is, the OIDInformation file 70 might contain attribute names, attribute values, method names, and other data that allows an SNMP agent 40 to send or receive information to or from the network resource 30 with which it is associated. The data in the OIDInformation file 70 is derived from the MIB associated with the network resource 30. The derivation of the OIDInformation file 70 can occur prior to the initial deployment of the SNMP agent 30. Thereafter, the OIDInformation file 70 can be modified as needed while the SNMP agent 30 is in operation. In this way, the SNMP agent 30 is effectively decoupled from the MIB. While the OIDInformation file 70 is depicted in FIG. 1 as a component of the network resource 30, it should be understood that in other embodiments, the OIDInformation file 70 might be outside the network resource 30.

Since the names of the method calls from the SNMP agent 40 to the network resource 30 are not tied to particular attribute names, as they are when an SNMP agent is compiled in conjunction with a MIB, generic method call names can be used by disparate SNMP agents 40. Modification of an attribute name does not require any change to the name of a method that calls that attribute and does not require recompiling an SNMP agent 40. The modification is simply made in an OIDInformation file 70 and the modified OIDInformation file 70 is deployed, via FTP for example, to any resource 30 to be available for use by the SNMP agent 40 on that resource.

As an example, the SNMP manager 20 might issue a Get command to network resource 30a with an argument of 1.2.3.1.1, as described above. Such a command might be sent to retrieve the power level on network resource 30a. The protocol component 50a on the SNMP agent 40a associated with network resource 30a would receive the command, parse it, and recognize the type of command. The adaptation component 60a would then refer to the OIDInformation file 70a and, based on the type and the argument of the command, determine the attribute to be retrieved and the method call needed to retrieve the attribute. The OID of the attribute to be retrieved may be found in the OIDInformation file 70a and will be used as an argument of the method call. The SNMP agent 40a would then issue the appropriate method call to the network resource 30a, retrieve the appropriate attribute value, and return the value to the SNMP manager 20. The network resources 30 may be the same or different types of network resources 30. It is contemplated that the same SNMP agent 40, since it is network resource independent, may be used on any number of different (make, model, type) network resources 30 and only needs the associated OIDInformation file 70 to operate with a particular network resource 30.

Figure 2:
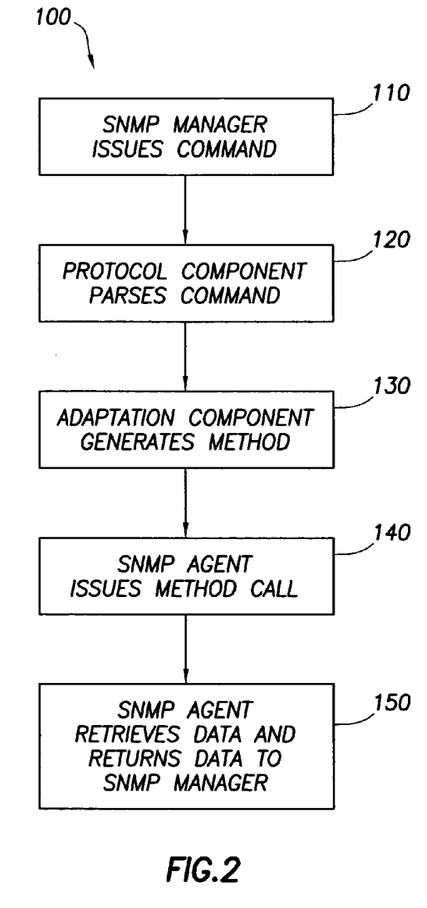
FIG. 2 illustrates a method for managing a network according to an embodiment of the present disclosure.

FIG. 2 illustrates an embodiment of a method 100 for managing a network using a MIB-independent SNMP agent. In box 110, an SNMP manager issues a standard SNMP command to an SNMP agent. In box 120, a protocol component within the SNMP agent receives and parses the command. In box 130, an adaptation component within the SNMP agent uses the information in the command and information in an OIDInformation file to determine a method capable of carrying out the SNMP command. In box 140, the SNMP agent issues the method call to a network resource.

If it is assumed that SNMP command was a Get command, a further step may occur where, in box 150, the SNMP agent retrieves requested data from the network resource and returns the data to the SNMP manager. In other embodiments, the method call from the SNMP agent to the network resource might perform a different action. For example, if the SNMP command were a Set command, the method call might fix the value of a variable in the network resource.

In an embodiment, the OIDInformation file 70 is generated automatically by an SNMP data tool. Standard header files that capture data structure definitions for an SNMP agent 40 are modified to create special header files that contain additional information. The SNMP data tool reads these special header files, extracts data structure information, and generates MIB files that can be used by an SNMP manager 20 and OIDInformation files 70 that can be used by SNMP agents 40.

Figure 3:
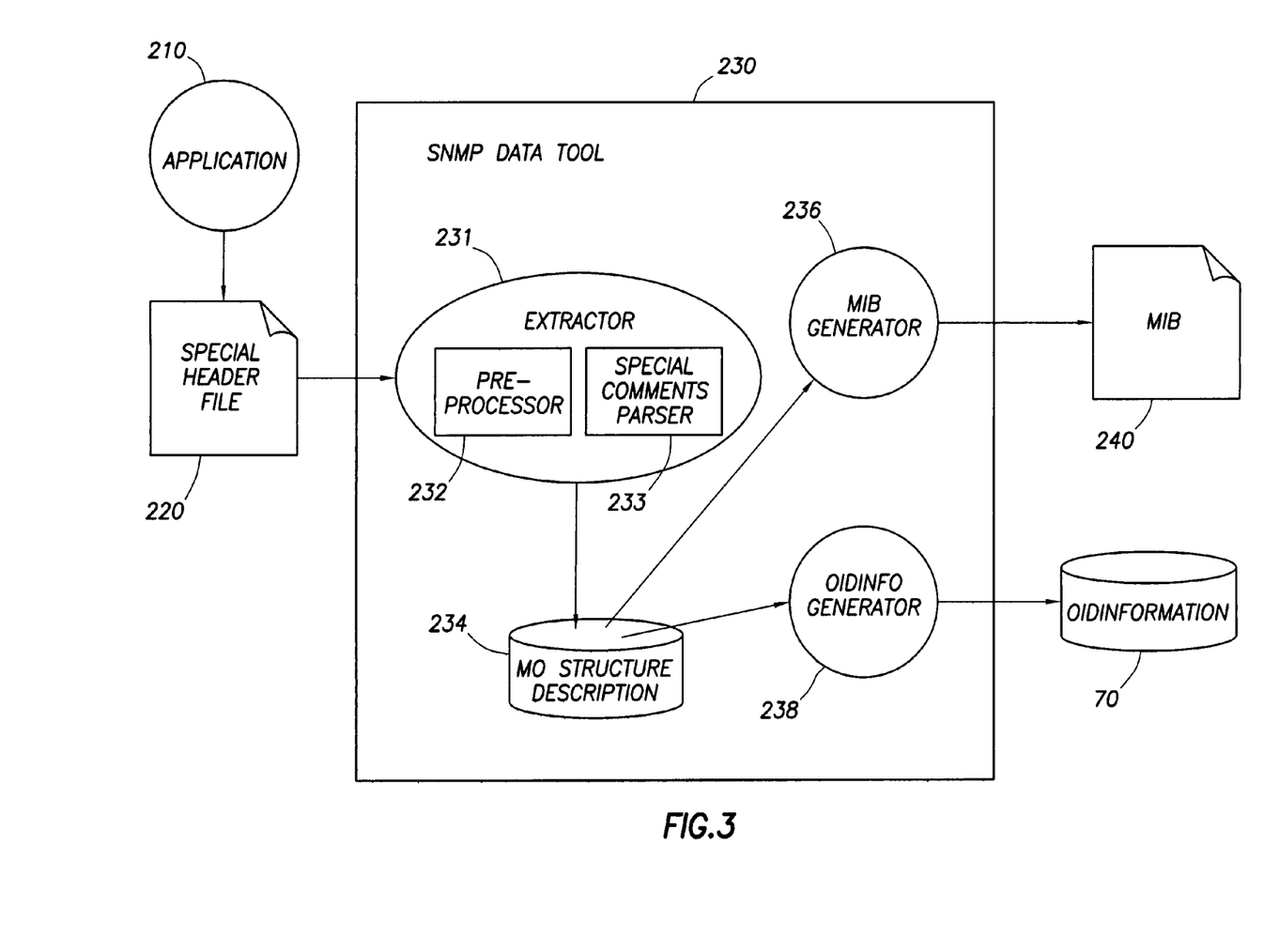
FIG. 3 illustrates a system for automated SNMP data generation according to an embodiment of the present disclosure.

FIG. 3 illustrates an SNMP data tool 230 capable of automatically generating an OIDInformation file 70. The SNMP data tool 230 includes an extractor 231, a managed object (MO) structure description file 234, a MIB generator 236, and an OIDInformation generator 238. The extractor 231 is capable of reading a special header file 220, extracting data from the special header file 220, and creating the MO structure description file 234 from the extracted data. The MIB generator 236 is capable of reading the MO structure description file 234 and generating a MIB file 240. The OIDInformation generator 238 is capable of reading the MO structure description file 234 and generating an OIDInformation file 70.

The special header file 220 is created by adding special comments to a standard header file used by an application 210. The application 210 might provide domain-specific functionality, such as call processing, operations administration and maintenance, or process monitoring, on a network resource. During development, programmers of the application 210 would typically make use of one or more header files that contain data structure definitions such as data types and field names and sizes. Header files such as these are commonly used in application development languages and are well known to one of skill in the art.

In an embodiment, special comments describing how to communicate with the application 210 are manually added to the standard header file. For example, the listening port number for the application 210 and the message ID to be used when sending requests to the application 210 may need to be included in the special comments of the special header file 220. The special comments might also contain information on how data in the standard header file should be converted from one data type to another. The data structure information from the standard header file and the special comments added to the standard header file together make up the special header file 220.

Below is an example of special header file 220.

```
#ifndef __HO__SOFTER__ITEMS__
#define __HO__SOFTER__ITEMS__
/*****************************************************
* oid              : hoSofterGroup.2
* struct_type      : table
* payload_type     : single
* request_id       : PM_REQ_ID
* response_id      : PM_RSP_ID
* port             : OPM_MIU_MBOX_ID
* description      : "Softer Handoff statistical data"
*****************************************************/
typedef struct {
    word32 hoSofterItmAncId;
    /* def: " ANC or CRP id"
     * role:index asn:none access:ronly range:none init:0 */
    word32 hoSofterItmSrcSectorId;
    /* def: "Source sector id"
     * role:index asn:none access:ronly range:none init:0 */
    word32 hoSofterItmDesSectorId;
    /* def: "Destination sector id"
     * role:index asn:none access:ronly range:none init:0 */
    int     hoSofterAddAtt;
    int     hoSofterAddHo;
    int     hoSofterDrpAtt;
    /* role:mo asn:Cnt32 access:ronly range:none init:none */
    int     hoSofterDrpHo;
    int     hoSofterAvrSuc;
} HoSofterItems;
#endif // __HO__SOFTER__ITEMS__
```

One of skill in the art will recognize that text between the characters /* and */ will be read as a comment. In an embodiment, these comments are the special comments that have been added to the standard header file to describe communication information and data conversion information. Other text in this example special header file 220 that is not between these characters is data structure information that was present in the standard header file from which the special header file 220 was derived.

The section of the example special header file 220 that is between the character string /************************************************ ********************** and the character string *********************************************** **********************/ can be referred to as the communication section. In an embodiment, the communication section contains information needed to communicate with the application 210** and takes the form of a series of variables and corresponding values.

The 'oid' variable gives the location of a managed object in the OID tree. The 'struct_type' variable indicates whether data in a message to or from the application 210 is in table form or scalar form. Table data can have multiple rows of data, while scalar data contains only one instance of data. The 'payload_type' variable can have a value of either single or multiple. With the multiple payload type, multiple rows of a table can be communicated in one message. With the single payload type, only one structure can be placed in a payload. The multiple type is more efficient but more complex.

The 'request_id' variable specifies an ID to be used for sending requests from an SNMP agent to the application 210. The 'response_id' variable specifies an ID to be used for sending responses from the application 210 back to the SNMP agent. The 'port' variable specifies the socket or port number where the application 210 is listening. The 'description' variable allows a special description to be added to a data structure to provide an easily readable text description of the header file information to a MIB file 240 or an OIDInformation file 70.

One of skill in the art will recognize that other variables might be present in the communication section and that other variable names could be used. It should also be recognized that all or portions of the communication section could be shared among multiple applications 210 that share common communications parameters. That is, by proper planning, an application developer might be able to reuse portions of the communication section for one application 210 in other applications so that the communication section does not need to be repeated in multiple applications.

The other commented text in the example special header file 220 is used to perform custom conversions of data types. A standard header file is typically written in C, C++, Java, or some other high-level programming language well known to one of skill in the art. MIB files 240 and OIDInformation files 70, on the other hand, are typically written in the Abstract Syntax Notation One (ASN.1). There is not always a one-to-one correspondence between the data types used in typical high-level languages and the data types used in ASN.1. In an embodiment, default conversions take place from the high-level data types to ASN.1 data types. For example, a C++ character array might be converted to an ASN.1 string as a default.

In some cases, however, the default conversion is not desired. For example, in some situations, a developer might wish to convert a C++ 'int' data type to an ASN.1 'gauge' data type instead of the default ASN.1 'int' data type. In such cases, a special comment can be added to the special header file 220 to specify the non-default conversion that is to occur. In an embodiment, special comments such as these are position dependent. When a custom conversion is desired, a special comment is placed immediately after the data item to be converted. Data items in a special header file 220 that are not immediately followed by a special comment undergo the default data type conversion. The special comments related to data type conversion are optional and need not be included if the default conversions are desired.

The use of position dependent special comments for custom data type conversions can be seen in the example special header file 220 listed above. For example, the data items 'int hoSofterAddAtt' and 'nt hoSofterAddHo' are not immediately followed by special comments and so will undergo a default data type conversion. The data item 'int hoSofterDrpAtt', on the other hand, is immediately followed by the special comment /* role:mo asn:Cnt32 access:ronly range: none init:none */ and so it will undergo a non-default data type conversion.

After a special header file 220 has been created by adding special comments to a standard header file, the special header file 220 can be fed into the extractor 231. In an embodiment, the extractor 231 includes two components, a preprocessor 232 and a special comments parser 233. The preprocessor 232 can be a commercial, off-the-shelf compiler or similar product or can be a custom-built component capable of parsing standard header files. In either case, the preprocessor 232 can read programming language specific data structures and field types and compile that data into a standard format used by the MO structure description file 234.

The special comments parser 233 is capable of reading the special comments embedded in a special header file 220. That is, the special comments parser 233 can read the communication information contained in the communication section and the data type conversion information contained in the other special comments in a special header file 220. The special comments parser 233 can then convert the data obtained from the special comments into a standard format used by the MO structure description file 234.

Together, the preprocessor 232 and the special comments parser 233 read a special header file 220 and convert the special header file 220 into an MO structure description file 234. Since the special comments are in the format of comments, special header files 220 are structurally and syntactically correct and, to the preprocessor 232, appear similar to standard header files. The preprocessor 232 ignores the special comments and treats a special header file 220 in the same manner as a standard header would be treated. The special comments parser 233 ignores the standard header portions of a special header file 220 and performs appropriate conversions of keywords in the special comments to extract communication and data type conversion information.

The extractor 231 compiles and converts data from a special header file 220 and places the converted data into the MO structure description file 234. The MO structure description file 234 contains the information from the special header file 220 in an easy to parse data format. The MO structure description file 234 acts as input to the MIB generator 236 and the OIDInformation generator 238. In other embodiments, it is contemplated that the extractor 231 might communicate and export directly to the MIB generator 236 and OID Information generator 238 and the MO structure description file 234 might be omitted.

The MIB generator 236 is capable of reading the MO structure description file 234 and using the data in that file to generate a MIB file 240 that is in standard ASN.1 notation and that can be read by an SNMP manager. The format and content of MIB files are well known to one skilled in the art. The OIDInformation generator 238 is capable of reading the MO structure description file 234 and using the data in that file to generate an OIDInformation file 70 that can be used by an SNMP agent. As mentioned previously, the use of an OIDInformation file 70 allows an SNMP agent to retrieve at run time any information it needs to communicate with its network resources and with an SNMP manager. Changes can be made to an OIDInformation file 70 without the need for making changes to source code.

Figure 4:
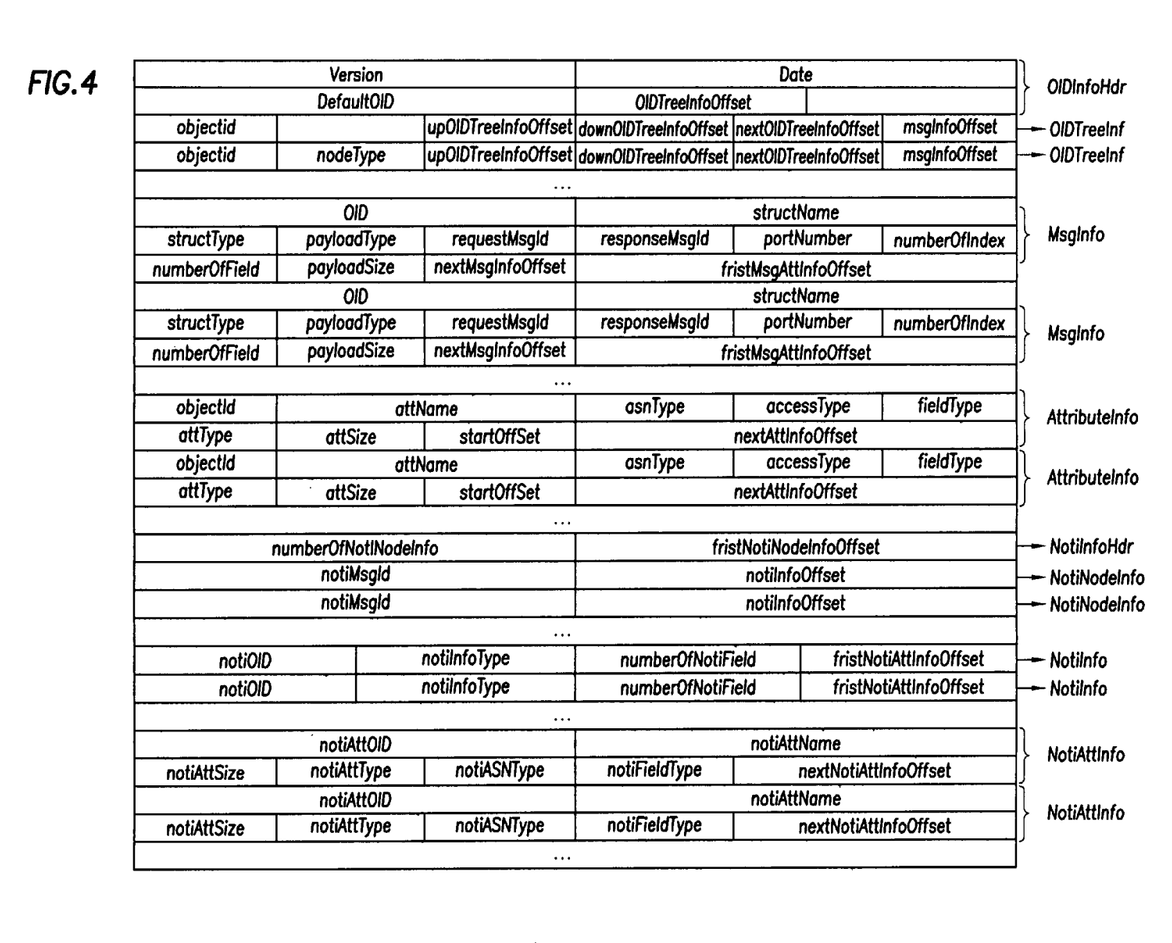
FIG. 4 illustrates an OIDInformation file data structure according to an embodiment of the present disclosure.

FIG. 4 illustrates a data structure for an embodiment of an OIDInformation file 70 that might be generated by the SNMP data tool 230 and used by an SNMP agent. In this embodiment, the OIDInformation file 70 includes eight sections: OIDInfoHdr, OIDTreeInfo, MsgInfo, AttInfo, NotiInfoHdr, NotiNodeInfo, NotiInfo, and NotiAttInfo. In other embodiments, other names could be used for the sections and other sections could be present.

In an embodiment, the OIDInformation file 70 begins with a header called OIDInfoHdr. This header consists of the following fields:

| | |
|---|---|
| Version | OID information file version |
| Date | OID information generation date |
| DefaultOID | This is the root OID of the MIB. Example: iso.org.dod.internet.private.enterprises = 1.3.6.1.4.1 |
| OIDTreeInfoOffset | Top OIDTreeInfo offset |
| NotiInfoHdrOffset | Top NotiInfoHdr offset |

The OIDTreeInfo section is used for searching the OID information tree. Each scalar, table, and MIB group is represented as a node in the OIDTreeInfo section. Each OIDTreeInfo structure consists of the following fields:

| | |
|---|---|
| ObjectId | Object id of the node, without default OID part |
| nodeType | Possible node types are scalar, table, and group |
| upOIDTreeInfoOffset | Indicates the offset value of the one level upper OIDTreeInfo |
| downOIDTreeInfoOffset | Indicates the offset value of the one level below OIDTreeInfo |
| nextOIDTreeInfoOffset | Indicates the offset value of the next same level OIDTreeInfo |
| msgInfoOffset | Message information offset value |

The MsgInfo section includes the application message header and the payload information. Each table and scalar group in the MIB is mapped to one MsgInfo section in the OIDInformation file 70. The MsgInfo section consists of the following fields:

| | |
|---|---|
| OID | String format OID until the group including the scalar nodes |
| structName | The name of the structure defined in special header file |
| structType | This field represents the type of the structure |
| payloadType | This field represents whether the application can operate multiple data rows in a single message or not. |
| requestMsgId | Application request message identifier. SNMP agent uses request message id when it is communicating with the application |
| responseMsgId | Application response message identifier. Application uses response message id when it is sending response back to the SNMP agent |
| portNumber | Application listening port number |
| numberOfIndex | Number of indexes in the structure, for scalar group it is 0 |

-continued

| | |
|---|---|
| numberOfField | Number of fields in the structure |
| payloadSize | The size of the application message payload |
| nextMsgInfoOffset | Offset of the next msgInfo |
| firstAttInfoOffset | Offset of the first AttInfo that represents each field data of the structure |

The AttInfo section represents information for a data field in a structure. The AttInfo section consists of the following fields:

| | |
|---|---|
| objectId | The object id of the field |
| attName | Name of the field in the special header file |
| asnType | Syntax type that the field is expressed in the MIB |
| accessType | Access type that the field is expressed in the MIB |
| fieldType | The field type(scalar value, table value, table and index) |
| attType | C data type defined in the structure |
| attSize | Size of the field in number of bytes |
| startOffSet | The starting offset of the field in the message payload |
| nextAttInfoOffset | Offset of the next field AttInfo |

The NotiInfoHdr section is used to obtain notification information using the message ID. The NotiInfoHdr section consists of the following fields:

| | |
|---|---|
| numberOfNotiNodeInfo | The number of NotiNodeInfo structures in the OID information. NotiNodeInfos are arranged sequentially by the message id. |
| firstNotiNodeInfoOffset | The first offset value of sequentially arranged NotiNodeInfo |

The NotiNodeInfo section is used with the NotiInfoHdr section to find the correct NotiInfo for a received notification message. The NotiNodeInfo section consists of the following fields:

| | |
|---|---|
| notiMsgId | Notification message id is used for searching the notification data |
| notiInfoOffset | The offset value of corresponding NotiInfo |

The NotiInfo section carries the notification information. The NotiInfo section consists of the following fields:

| | |
|---|---|
| notiOID | The notification OID defined in the MIB |
| notiInfoType | Shows whether the notification is a trap or an inform. Inform is a confirmed notification, whereas trap's delivery is not guaranteed |
| numberOfNotiField | The field count in the notification structure defined in the special header file |
| firstNotiAttInfoOffset | The first NotiAttInfo offset that has the notification structure data defined in the special header file |

The NotiAttInfo section represents each field data in the notification message. The NotiAttInfo section consists of the following fields:

| | |
|---|---|
| notiAttOID | A string to represent the field OID |
| notiAttName | The field name defined in the special header file |
| notiAttSize | The field size |
| notiAttType | C data type of the field |
| notiASNType | ASN syntax type of the field in the MIB |
| notiFieldType | Indicates whether the field is index or not |
| nextNotiAttInfoOffset | Offset of the next NotiAttInfo |

Figure 5:
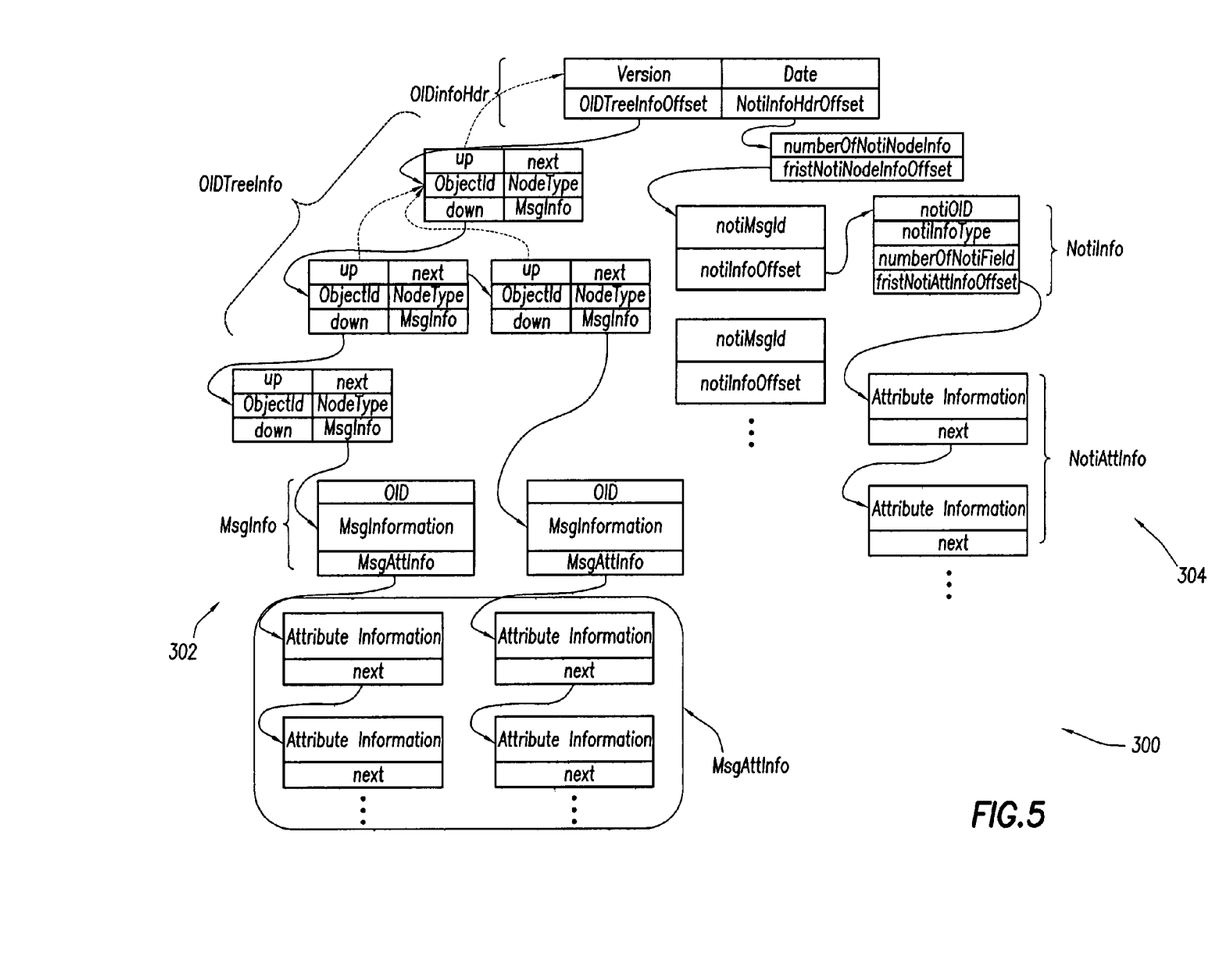
FIG. 5 illustrates an OID information tree structure in accordance with one embodiment of the present disclosure.

FIG. 5 is a diagram of an OID information tree structure 300. The OID information tree structure 300, generally, has two sections. The first section 302 may be used to search the tree structure 300 using OID. The second section 304 is used to obtain notification data using the message id.

Figure 6:
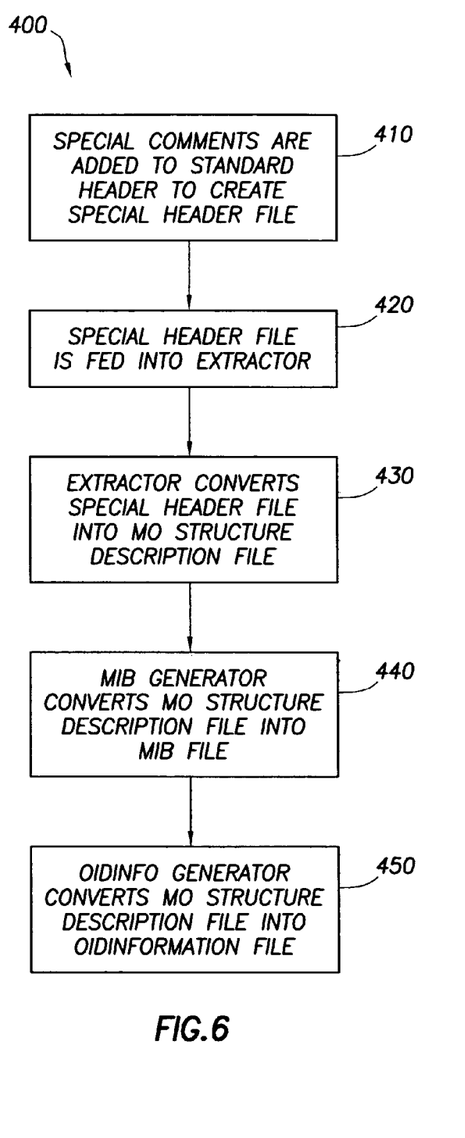
FIG. 6 illustrates a method for automated SNMP data generation according to an embodiment of the present disclosure.

FIG. 6 illustrates an embodiment of a method 400 for automatically generating a MIB file and an OIDInformation file. In box 410, special comments are added to a standard header to create a special header file. A portion of the special comments might be placed in a communication section of the special header file that describes communication parameters for an application that will use the OIDInformation file. Other special comments in the special header file might include instructions for custom conversions of data types from the format used by the standard header to the ASN.1 format.

In box 420, the special header file is fed into an extractor component of an SNMP data tool. A preprocessor in the extractor might read the data that was included in the standard header before the special comments were added. A special comments parser component in the extractor might read the special comments that were added to the standard header.

In box 430, the extractor creates a managed object (MO) structure description file component of the SNMP data tool based on the data in the special header file. The MO structure description file uses a text format to maintain the data obtained by the extractor.

In box 440, a MIB generator component of the SNMP data tool generates a MIB file from the MO structure description file. In box 450, an OIDInformation generator component of the SNMP data tool generates an OIDInformation file from the MO structure description file. These steps do not necessarily need to occur in the order indicated. For example, the OIDInformation file could be generated before the MIB file or the OIDInformation file and the MIB file could be generated in parallel.

The use of the SNMP data tool allows a MIB file and an OIDInformation file to be automatically created. Previously, creation of a MIB file might require a developer to manually convert the data structures in a header into the ASN.1 formatted data structures used by a MIB. Such a manual conversion was difficult and error prone. The use of the SNMP data tool also keeps the MIB file and OIDInformation file synchronized. Since the MIB file is used by an SNMP manager and the OIDInformation file is used by an SNMP agent in communication with the SNMP manager, a one-to-one mapping is typically desirable for the fields and data types in the MIB file and the OIDInformation file. The use of a common MO structure description file by both the MIB generator and the OIDInformation generator is one method for providing such synchronization.

Figure 7:
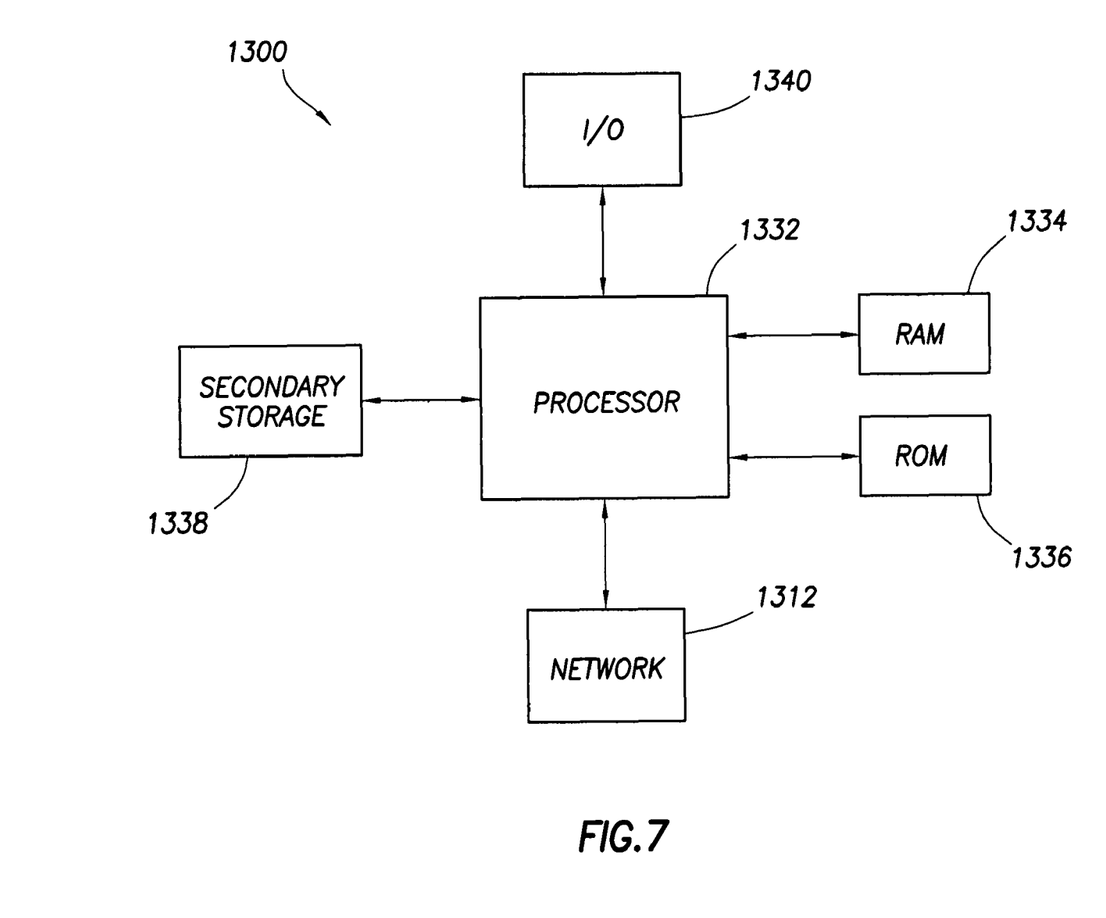
FIG. 7 illustrates an exemplary general purpose computer operable for several of the embodiments.

Some of the systems described above, such as the SNMP data tool 230, may be implemented on any general-purpose computer with sufficient processing power, memory resources, and network throughput capability to handle the necessary workload placed upon it. FIG. 7 illustrates a typical, general-purpose computer system suitable for implementing some of the systems and/or embodiments disclosed herein. The computer system 1200 includes a processor 1332 (which may be referred to as a central processor unit or CPU)

that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, software, or scripts that it accesses from hard disk, floppy disk, optical disk (these various disk-based systems may all be considered secondary storage 1338), ROM 1336, RAM 1334, or the network connectivity devices 1312, or other computer readable medium.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer system for automated SNMP data generation, comprising:
    a processor;
    a memory readable by the processor;
    a special header file stored in the memory and operable to contain standard header file data and special comments data;
    an extractor component operable by the processor to convert the special header file into a managed object structure description file, the extractor component comprising a special comments parser operable to parse the special comments data of the special header file;
    a MIB generator component operable by the processor to convert the managed object structure description file into a management information base file; and
    an OIDInformation generator component operable by the processor to convert the managed object structure description file into an OIDInformation file, the OIDInformation file operable to retain and provide data related to a network resource.

2. The computer system of claim 1, wherein the special comments data contained in the special header file comprises data related to communication with the network resource and data related to conversion of a data type used by the standard header to an Abstract Syntax Notation One format.

3. The computer system of claim 2, wherein the conversion from a data type used by the standard header file for to the Abstract Syntax Notation One format occurs via a default data type mapping when no special comment is associated with the data type and occurs according to an instruction in the special comments when a special comment appears adjacent to the data type in the special header file.

4. The computer system of claim 1, wherein the extractor component further comprises a preprocessor component operable to parse the standard header file portion of the special header file.

5. The computer system of claim 1, wherein the management information base file is used by an SNMP manager.

6. The computer system of claim 1, wherein the OIDInformation file is used by an SNMP agent operable to communicate with the SNMP manager and with the network resource, the SNMP agent not compiled with either of a management information base file or the OIDInformation file.

7. A non-transitory computer readable storage medium containing software for automated network resource related data generation, the software comprising:
- an extractor component in communication with a special header file that contains standard header file data and special comments data, the extractor component operable, when executed, to cause a computer system to extract the standard header file data and parse the special comments data;
- a MIB generator component in communication with the extractor component, the MIB generator component operable, when executed, to cause the computer system to convert the extracted data into a management information base file; and
- an OIDInformation generator component in communication with the extractor component, the OIDInformation generator component operable, when executed, to cause a computer system to convert the extracted data into an OIDInformation file that maintains data related to a network resource, the OIDInformation file used by a generic SNMP agent on the network resource.

8. The non-transitory computer readable storage medium of claim 7, wherein the standard header file data includes data structures used by applications programmed for communication regarding the network resource.

9. The non-transitory computer readable storage medium of claim 7, wherein the special comments data includes information to promote communication of information between the network resources and the application.

10. A method for automated network resource related data generation in a computer system, comprising:
- adding, by the computer system, a plurality of special comments to a standard header file;
- converting, by the computer system, the special header file into a managed object file;
- converting, by the computer system, the managed object file into a management information base file; and
- converting, by the computer system, the managed object file into an OIDInformation file, the OIDInformation file maintaining data related to a network resource.

11. The method of claim 10, further comprising:
- generating, by the computer system, a special header file containing the plurality of special comments and the standard header file; and
- adding, by the computer system, special comments in a communication section of the special header file related to communication with the network resource.

12. The method of claim 11, further comprising:
- adding, by the computer system, special comments related to conversion of a data type used by the standard header file to an Abstract Syntax Notation One format.

13. The method of claim 12, further comprising:
- parsing, by the computer system, a data portion of the special header file related to data structures used by an application associated with the standard header file.

14. The method of claim 12, further comprising:
- parsing, by the computer system, the plurality of special comments.

15. The method of claim 14, wherein conversion from a data type used by the standard header to the Abstract Syntax Notation One format occurs via a default data type mapping when no special comment is associated with the data type and occurs according to an instruction in the special comments when the special comments appear adjacent to the data type in the special header file.

16. The method of claim 10, wherein the OIDInformation file is operable for use by a generic SNMP agent to communicate with the network resource, and wherein the generic SNMP agent is not compiled in conjunction with the OIDInformation file.

17. The method of claim 10, wherein the managed object file is further defined as a managed object structure description file.

18. The method of claim 10, further comprising:
- deploying, by the computer system, the OIDInformation file to the network resource while a generic SNMP agent is in operation on the network resource.

19. The method of claim 10, further comprising a SNMP manager using the management information base file to generate commands related to the network resource.

20. The method of claim 10, further comprising:
- changing, by the computer system, an application and corresponding standard header file, the change related to communication regarding an attribute of the network resource;
- regenerating, by the computer system, the management information base file and the OIDInformation file based on the change to the application and the standard header file;
- deploying, by the computer system, the regenerated OIDInformation file to the network resource; and
- communicating regarding the attribute via a generic SNMP agent that uses the regenerated OIDInformation file to communicate regarding attribute changes of the network resource.

* * * * *